(12) United States Patent
Hsieh et al.

(10) Patent No.: US 12,002,599 B2
(45) Date of Patent: Jun. 4, 2024

(54) WIRE DRAWING METHOD AND SUPERCONDUCTING WIRE

(71) Applicant: Hitachi, Ltd., Tokyo (JP)

(72) Inventors: Cheng Ting Hsieh, Tokyo (JP); Younjeong Hong, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 17/841,886

(22) Filed: Jun. 16, 2022

(65) Prior Publication Data
US 2023/0154654 A1 May 18, 2023

(30) Foreign Application Priority Data
Jun. 30, 2021 (JP) .................. 2021-109756

(51) Int. Cl.
*H01B 12/06* (2006.01)
*H01B 13/00* (2006.01)

(52) U.S. Cl.
CPC ......... *H01B 12/06* (2013.01); *H01B 13/0006* (2013.01)

(58) Field of Classification Search
CPC ..... H01B 12/06; H01B 12/08; H01B 13/0006
See application file for complete search history.

(56) References Cited

U.S. PATENT DOCUMENTS
2021/0233685 A1 7/2021 Suzuki et al.

FOREIGN PATENT DOCUMENTS

| JP | 9-139124 A | 5/1997 |
| JP | 2013-252565 A | 12/2013 |
| JP | 2016-126950 A | 7/2016 |
| JP | 2020-31002 A | 2/2020 |

*Primary Examiner* — Jeremy C Norris
(74) *Attorney, Agent, or Firm* — Crowell & Moring LLP (57) ABSTRACT

In a wire drawing method, processing stability is ensured by preventing a shape from deforming non-uniformly. The wire drawing method includes: using a first wire that includes a center member, a plurality of first peripheral wires surrounding the center member, and an outer shell disposed outside the first peripheral wires; and reducing a cross-sectional diameter of the first wire by wire drawing. A shape of a cross section perpendicular to a longitudinal direction of the first peripheral wire is a substantially isosceles trapezoidal shape including a long side in contact with the outer shell, a short side in contact with the center member, and a first oblique side and a second oblique side that are in contact with the adjacent peripheral wires.

13 Claims, 6 Drawing Sheets

WIRE DRAWING METHOD AND SUPERCONDUCTING WIRE

BACKGROUND OF THE INVENTION

1. Field of the Invention

The present invention relates to a wire drawing method and a superconducting wire.

2. Description of the Related Art

A high-temperature superconducting wire is manufactured by filling a metal tube with a mixed powder, further introducing a plurality of the metal tubes filled with the mixed powder into another tube, and processing the tube into an elongated wire by a wire drawing method. In the method, a wire drawing method generally used for a metal tube or a metal rod is applied. A wire pulling-out method, which is an example of the wire drawing method, is described in, for example, JP-A-2013-252565.

The above wire pulling-out method is a processing method in which a material to be drawn passes through a die hole having a hole diameter smaller than a maximum diameter of the material, so that a cross-sectional diameter of the material is reduced to a diameter that is the same as the hole diameter. A step of passing the material through a die hole whose die hole diameter gradually decreases is performed a plurality of times until a target cross-sectional diameter is obtained.

For example, a high-temperature superconducting wire includes a cylindrical copper tube positioned on a central portion of a cross section perpendicular to a longitudinal direction of the wire, a plurality of cylindrical iron tubes disposed around the copper tube and filled with a mixed powder, and a cylindrical Monel tube disposed outside the plurality of cylindrical iron tubes, and a wire formed of a plurality of materials is drawn.

When the wire pulling-out method is used, the step of passing the material through the die hole is repeatedly performed to manufacture an elongated wire. In the wire drawing of a wire including a plurality of cylindrical metal members and a compressive material (for example, the mixed powder), deformation starts from a metal tube positioned on an outermost circumferential side. During the wire drawing, since a location where a pressure is applied from the metal tube positioned on the outermost circumferential side to a material inside is constant, stress is locally concentrated on the location. When a shape of each of the metal tubes filled with the compressive material and disposed around the metal tube positioned at a central portion of a cross section is a cylindrical shape, a contact state between the cylindrical metal tubes is point contact in the middle of the wire drawing.

As a result, local stress concentration and a non-uniform average porosity distribution are generated inside the wire, and thus defects such as disconnection and performance deterioration of the wire may occur. In addition, since the contact state between the metal tubes is unstable, compression of the material during the wire drawing becomes non-uniform.

For example, when a plurality of cylindrical iron tubes filled with the mixed powder are used for the high-temperature superconducting wire, a decrease in processing ability occurs due to the local deformation and the unstable contact state in the wire during the wire drawing. Therefore, it is an object to ensure processing stability by preventing a shape from deforming non-uniformly.

In particular, in the high-temperature superconducting wire, an average porosity distribution of the mixed powder becomes non-uniform due to the non-uniform deformation, and thus performance of the superconducting wire deteriorates, and it is an object to prevent a quality variation of the superconducting wire due to the processing stability.

SUMMARY OF THE INVENTION

An object of the invention is to ensure the processing stability by preventing a shape from deforming non-uniformly in a wire drawing method.

A wire drawing method according to an aspect of the invention includes reducing a cross-sectional diameter of a first wire by wire drawing. The first wire includes a center member, a plurality of first peripheral wires surrounding the center member, and an outer shell disposed outside the first peripheral wires. Each of the first peripheral wires includes a compressive material and a metal sheath covering the compressive material, and a shape of a cross section perpendicular to a longitudinal direction of the first peripheral wire is a substantially isosceles trapezoidal shape including a long side in contact with the outer shell, a short side in contact with the center member, and a first oblique side and a second oblique side that are in contact with the adjacent peripheral wires.

A superconducting wire according to another aspect of the invention includes a core, a plurality of peripheral wires surrounding the core, and an outer shell disposed outside the peripheral wires. Each of the peripheral wires includes a porous material and a peripheral-wire cover covering the porous material, a shape of a cross section perpendicular to a longitudinal direction of the peripheral wire is a substantially annular sector including a first side in contact with the outer shell, a second side in contact with the core, and a third side and a fourth side that are in contact with the adjacent peripheral wires, a first average pore diameter of the porous material at a midpoint of the first side is larger than either one of a second average pore diameter of the porous material at a first point that is an intersection of the first side and the third side and a third average pore diameter of the porous material at a second point that is an intersection of the first side and the fourth side, and a fourth average pore diameter of the porous material at a midpoint of the second side is smaller than either one of a fifth average pore diameter of the porous material at a third point that is an intersection of the second side and the third side and a sixth average pore diameter of the porous material at a fourth point that is an intersection of the second side and the fourth side.

A superconducting wire according to still another aspect of the invention includes a core, a plurality of peripheral wires surrounding the core, and an outer shell disposed outside the peripheral wires. Each of the peripheral wires includes a porous material and a peripheral-wire cover covering the porous material, a shape of a cross section perpendicular to a longitudinal direction of the peripheral wire is a substantially annular sector including a first side in contact with the outer shell, a second side in contact with the core, and a third side and a fourth side that are in contact with the adjacent peripheral wires, a pore diameter of the porous material is always larger than a minimum value of pore diameters at (1) a first point that is an intersection of the first side and the third side, (2) a second point that is an intersection of the first side and the fourth side, and (3) a midpoint of the second side, and a pore diameter of the porous material at a midpoint of the first side is larger than a maximum value of pore diameters at the first point and the second point.

According to an aspect of the invention, in a wire drawing method, the processing stability can be ensured by preventing a shape from deforming non-uniformly.

DESCRIPTION OF THE PREFERRED EMBODIMENTS

Embodiments of the invention relate to wire drawing of a high-temperature superconducting wire or a material including a plurality of metal tubes or metal rods and a compressive material (for example, a mixed powder). For example, in a step of manufacturing the high-temperature superconducting wire, in a state in which a metal tube and a plurality of cylindrical metal tubes disposed around the metal tube and filled with a mixed powder are bundled and incorporated into a large metal tube, a cross-sectional diameter of a wire is reduced by using a wire pulling-out method using a die or the like.

In the middle of the wire drawing, due to the reduction in the cross-sectional diameter of the wire, a local pressure is applied to the cylindrical metal tubes filled with the mixed powder from the large metal tube positioned on an outermost peripheral side, and thus a shape deforms non-uniformly, and a risk of disconnection may occur.

In addition, due to the non-uniform deformation, a local average porosity increases inside the mixed powder, and an average porosity distribution also becomes non-uniform. As a result, a critical current density of the superconducting wire may decrease. In addition, since a contact state between the cylindrical metal tubes filled with the mixed powder is point contact in an initial stage of processing, a large variation in a cross-sectional shape after the wire drawing may occur due to such an unstable processing state.

In order to obtain a high-temperature superconducting wire with less disconnection and high performance, a deformation behavior inside the wire is required to be uniform in the middle of the wire drawing to improve the processing stability.

Therefore, in the embodiment, for a wire in a state in which a metal tube and a plurality of peripheral wires disposed around the metal tube and each including a mixed powder and a metal tube are bundled and incorporated into a large metal tube, a cross-sectional shape of each of the plurality of peripheral wires including the mixed powder and the metal tube is not circular but is a substantially isosceles trapezoidal shape.

For example, computer aided engineering (CAE) is used to examine equivalent strain and an average porosity after the wire drawing based on the cross-sectional shapes of the plurality of peripheral wires disposed in the wire, and results of the examination are used. In the CAE examination, CAE is used to examine wire drawing of reducing a maximum cross-sectional diameter of the wire before the wire drawing by 35% or more.

The equivalent strain and the average porosity generated in the peripheral wires when the cross-sectional diameter of the wire is smaller than an initial cross-sectional diameter by 35% or more are measured, and the measurement results are used to evaluate, by CAE, an effect generated by processing the peripheral wires before the wire drawing into a trapezoidal shape.

As a result, according to the above embodiment, the deformation behavior inside the wire is made uniform in the wire drawing by processing the peripheral wires before the wire drawing into the trapezoidal shape. Accordingly, defects such as the disconnection can be reduced, a cross sectional region in which an average porosity of the compressive material is 30% or less can be enlarged, and performance of the wire can be improved. In addition, by stabilizing the contact state between the peripheral wires, variations in a shape after the wire drawing can be reduced, and a manufacturing cost can be reduced.

Hereinafter, embodiments will be described with reference to the drawings.

Embodiment 1

Hereinafter, a wire drawing method in Embodiment 1 will be described with reference to the drawings.

A wire 100 before the wire drawing, which is a material including a center member 106, peripheral wires 103 each having a substantially isosceles trapezoidal shape, and an outer shell 109, will be described with reference to FIG. 1.

Figure 1A:
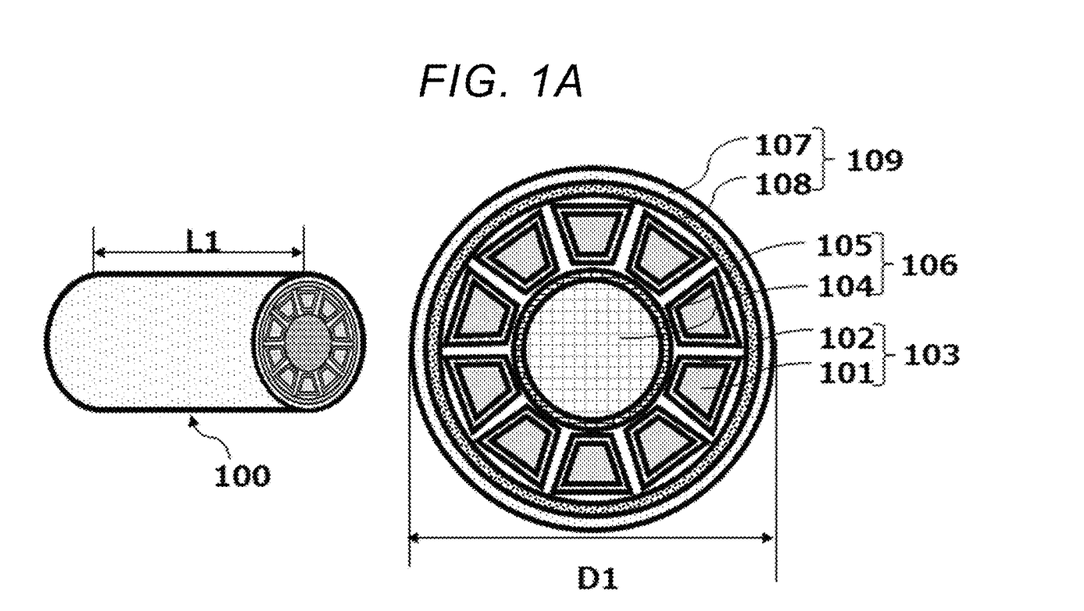
FIG. 1A is a cross-sectional view of a wire including a center member, peripheral wires each having a substantially isosceles trapezoidal cross-sectional shape, and an outer shell before wire drawing.

FIG. 1A shows the wire 100 in which ten peripheral wires 103 each having a substantially isosceles trapezoidal shape are disposed around one center member 106, and the peripheral wires 103 and the center member 106 are incorporated into the outer shell 109. A longitudinal length of the wire is denoted by L1. In the wire 100 including ten peripheral wires 103, the center member 106 includes a core member 104 that is formed by a circular metal rod, and a covering material 105 that is formed by a circular metal tube covering the core member 104. The outer shell 109 includes two layers of an outer layer 107 and an inner layer 108, the inner layer 108 is formed by a circular metal tube, and the outer layer 107 is formed by a circular metal tube having an outer diameter D1.

Figure 1B:
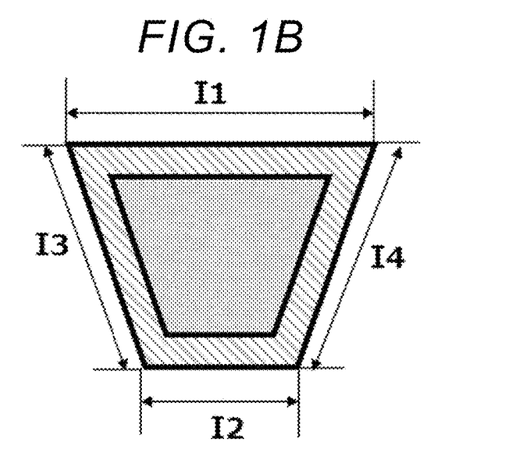
FIG. 1B is a cross-sectional view of the peripheral wires each including a compressible material and a metal tube before the wire drawing.

As shown in FIG. 1B, in each of the peripheral wires 103, a compressive material (for example, a mixed powder) 101 having a substantially isosceles trapezoidal shape is covered with a metal sheath 102. A cross-sectional shape of each of the peripheral wires 103 is a substantially isosceles trapezoidal shape including a long side I1, a short side I2, a first oblique side I3, and a second oblique side I4. The long side I1 is positioned on an inner circumferential side of the outer shell 109, and the short side I2 is positioned on the outer circumferential side of the center member 106.

A wire before the wire drawing, whose peripheral wire has a circular cross-sectional shape, is also prepared as a comparative wire.

A wire 100 before the wire drawing, which is a material including the center member 106, circular peripheral wires 103, and the outer shell 109, will be described with reference to FIG. 2. Configurations, shapes, and arrangements of the center member 106 and the outer shell 109 are the same as those of the wire 100 before the wire drawing in FIG. 1. On the other hand, in the wire in FIG. 2, a cross-sectional shape of each of the peripheral wires 103 is a circle having an outer diameter D3.

Examples of a processing method for drawing a wire include wire pulling-out, cassette roll processing, and groove roll processing, and among these processing methods, the wire pulling-out will be described as an example in Embodiment 1.

A configuration of a wire pulling-out device, which is an example of a wire drawing device, will be described with reference to FIG. 3.

Figure 3:
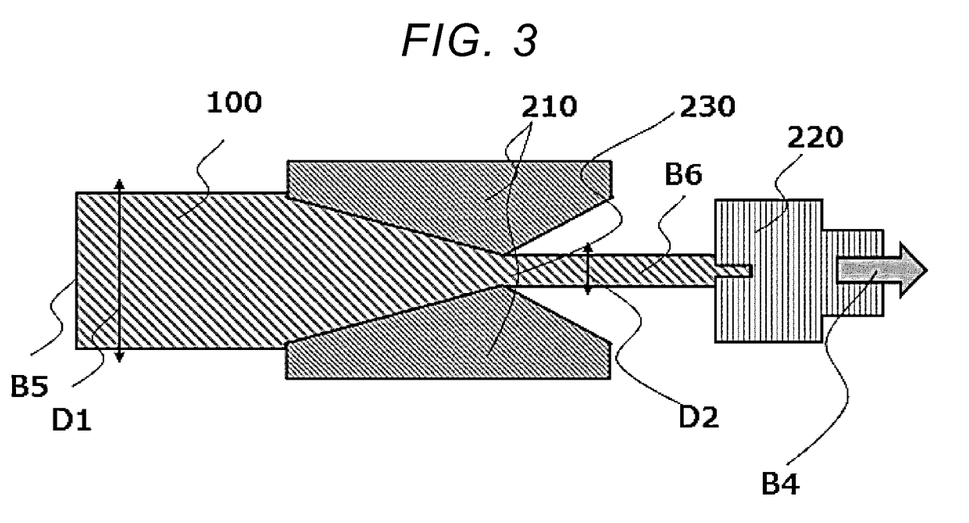
FIG. 3 is a simplified view of a wire pulling-out device.

As shown in FIG. 3, the wire pulling-out device includes a die 210 including a hole 230, and a gripping unit (chuck unit) 220. The wire 100 including an end portion B5 with an initial diameter of D1 is moved by pulling the gripping unit 220 in a B4 direction through a predetermined tensile force in a state in which an end portion B6 of the wire 100 is gripped by the gripping unit 220. Accordingly, the cross-sectional diameter D1 of the end portion B5 is reduced to a cross-sectional diameter D2 of the end portion B6.

Specifically, the wire 100 is pulled in the B4 direction by the gripping unit 220 to pass the wire 100 through the hole 230 of the die 210. In the wire 100 that passes through the hole 230 of the die 210, the initial diameter D1 is smaller than a diameter of the die and is reduced to the cross-sectional diameter D2. As a result, the longitudinal length of the wire 100 that passes through the hole 230 is increased while the cross-sectional diameter of the wire 100 is reduced.

Figure 2A:
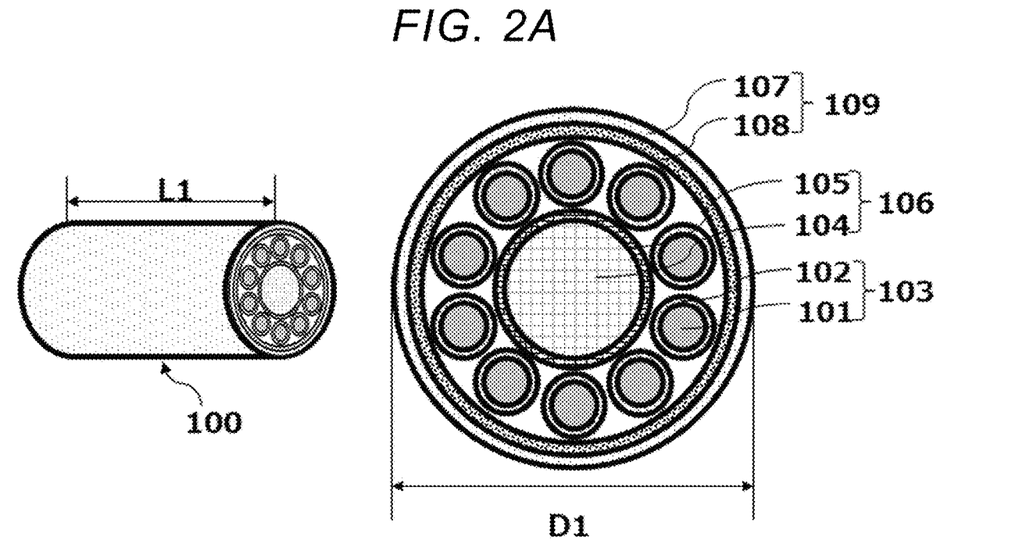
FIG. 2A is a cross-sectional view of a wire including a center member, circular peripheral wires, and an outer shell before the wire drawing.
Figure 2B:
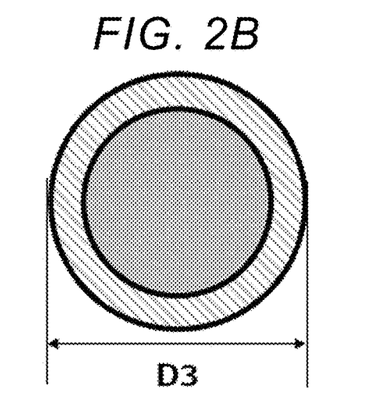
FIG. 2B is a cross-sectional view of the peripheral wires each including a compressible material and a metal tube before the wire drawing.

For the wire 100 having the cross-sectional diameter of D1 before the wire drawing, which is shown in FIG. 1 and is a material including the center member 106, the peripheral wires 103 each having a substantially isosceles trapezoidal shape, and the outer shell 109, and the wire 100 having the cross-sectional diameter of D1 before the wire drawing, which is shown in FIG. 2 and is a material including the center member 106, the circular peripheral wires 103, and the outer shell 109, the cross-sectional diameters are reduced from D1 to D2 by the wire pulling-out device in FIG. 3 to produce a wire 100 having the cross-sectional diameter of D2.

A result of examining, by the CAE, wire drawing of reducing a maximum cross-sectional diameter of the wire 100 before the wire drawing by 35% or more will be described below.

For example, as metal materials having different deformation resistances, the core member 104 in the center members 106 in FIGS. 1 and 2 is a copper rod, the outer layer 107 in the outer shell 109 is a Monel tube, the covering material 105 in the center member 106, the metal sheath 102 in each of the peripheral wires 103, and the inner layer 108 in the outer shell 109 are low carbon steel, and among the three metal materials, the deformation resistance of the outer layer 107 is the maximum and the deformation resistance of the core member 104 is the minimum. In addition, the compressive material 101 in each of the peripheral wires 103 is a mixed powder of Mg and B having an average porosity of 50%.

The wire 100 having the length of L1 and the cross-sectional diameter of D2, which includes the center member 106, the peripheral wires 103, and the outer shell 109, is subjected to the wire pulling-out, so that the initial cross-sectional diameter D1 is reduced by 35% to obtain the cross-sectional diameter D2. The length of the wire 100 after the wire drawing is changed from L1 to L2. This examination is performed by measuring, for example, a contact state between the peripheral wires in the middle of the wire pulling-out, and an equivalent strain distribution and an average porosity distribution after the wire pulling-out.

The wire 100 having the length of L2 and the cross-sectional diameter of D2 after the wire drawing, which is a material including the center member 106, the peripheral wires 103 each having the substantially isosceles trapezoidal shape, and the outer shell 109, will be described with reference to FIGS. 4A and 4B.

Figure 4A:
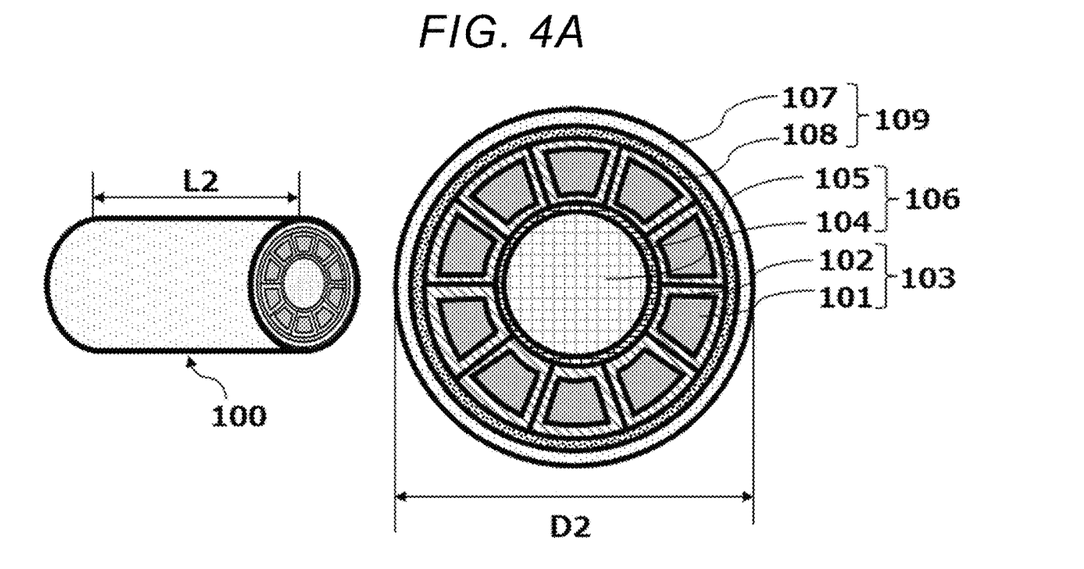
FIG. 4A is a cross-sectional view of the wire including the center member, the peripheral wires each having the substantially isosceles trapezoidal cross-sectional shape, and the outer shell after the wire drawing.
Figure 4B:
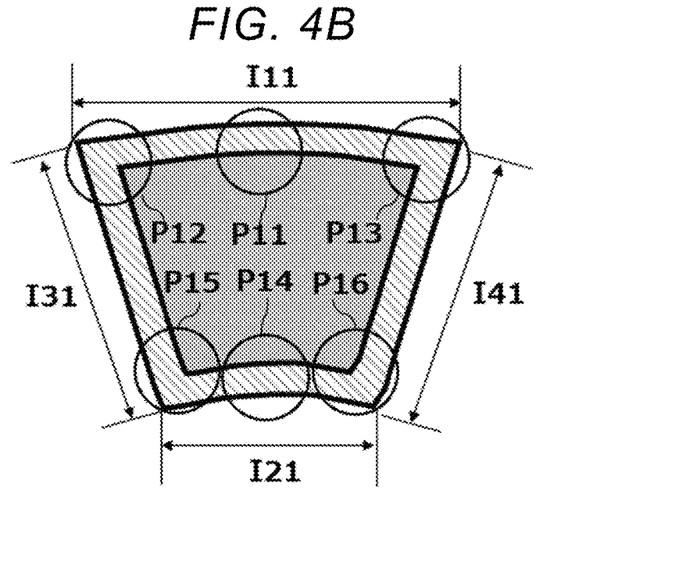
FIG. 4B is a cross-sectional view of the peripheral wires each including the compressible material and the metal tube after the wire drawing.

As shown in FIG. 4B, it is confirmed that a cross-sectional shape of the compressive material 101 after the processing is deformed to a shape similar to a shape before the wire drawing by reducing the shape before the wire drawing in a similar shape, and a cross section of each of the peripheral wires 103 after the wire drawing is changed from the substantially isosceles trapezoidal shape to a substantially annular sector including a first side I11 in contact with the outer shell 109, a second side I21 in contact with the center member 106, and a third side I31 and a fourth side I41 that are in contact with the adjacent peripheral wires 103.

As a result of measuring the average porosity by the CAE, it is confirmed that an average porosity of the compressive material 101 at a midpoint P11 of the first side I11 is larger than either one of an average porosity of the compressive material 101 at a first point P12 that is an intersection of the first side I11 and the third side I31 and an average porosity of the compressive material 101 at a second point P13 that is an intersection of the first side I11 and the fourth side I41. This is a characteristic inherent to such a manufacturing process. This is because pores are compacted since the first point P12 and the second point P13 are locations to which a pressure is applied from the outer shell 109 during the wire drawing.

It is confirmed that an average porosity of the compressive material 101 at a midpoint P14 of the second side I21 is smaller than, by about 10%, either one of an average porosity of the compressive material 101 at a third point P15 that is an intersection of the second side I21 and the third side I31 and an average porosity of the compressive material 101 at a fourth point P16 that is an intersection of the second side I21 and the fourth side I41. This is also a characteristic inherent to such a manufacturing process. This is because the pores are compacted by compressing the second side I21 more uniformly than the comparative wire (the wire 100 using the circular peripheral wires 103) due to the reduction of the outer shell 109 during the wire drawing.

Based on the two characteristics described above, it is confirmed that a cross-sectional region in which the average porosity of the compressive material 101 in the wire 100 is 0.3 or less increases since the average porosity distribution of the compressive material 101 during the wire drawing is made uniform, and in particular, the average porosity at the first point P12 and the average porosity at the second point P13 become smaller than those of the comparative wire.

For example, it is considered that the critical current density, which is performance of the superconducting wire, depends on the average porosity of the compressive material 101 in the wire, and a critical current property of the wire 100 is improved by processing the peripheral wires 103 from a shape before the wire drawing into a trapezoidal shape.

In addition, by processing the peripheral wires 103 from the shape before the wire drawing into the trapezoidal shape, the contact state between the peripheral wires becomes a line contact state in the middle of the wire drawing. Therefore, a positional deviation is less likely to occur along with the deformation, and the compression of the compressive material 101 in the peripheral wires 103 during the wire drawing is made uniform when the cross-sectional shape of the peripheral wires 103 is compared with that of the peripheral wires 103 of the comparative wire (wire 100 using the circular peripheral wires 103). Therefore, it is considered that the wire 100 manufactured by processing the peripheral wires 103 into the trapezoidal shape has improved processing stability during molding. Since variation can be reduced by improving the processing stability, stability of quality can be ensured during mass production, and a manufacturing cost can be reduced.

In addition, by processing the peripheral wires 103 from the shape before the wire drawing into the trapezoidal shape, strain is preferentially introduced from the outer shell 109 to both left and right sides of the long side I1 of each of the peripheral wires 103 in the middle of the wire drawing, so that the cross-sectional shapes of the peripheral wires 103 are reduced in a shape similar to the cross-sectional shape before the wire drawing. Therefore, based on the results of the CAE, it is confirmed that strain concentration on the metal sheaths (covering materials) 102 of the peripheral wires 103 metal sheath during the wire drawing can be avoided as compared with the comparative wire. In addition, defects such as disconnection can be reduced by uniform deformation, the stability of the quality can be ensured during the mass production, and the manufacturing cost can be reduced.

The wire 100 having the length of L2 and the cross-sectional diameter of D2 after the wire drawing, which is a material including the center member 106, the circular peripheral wires 103, and the outer shell 109, will be described with reference to FIG. 5.

Figure 5A:
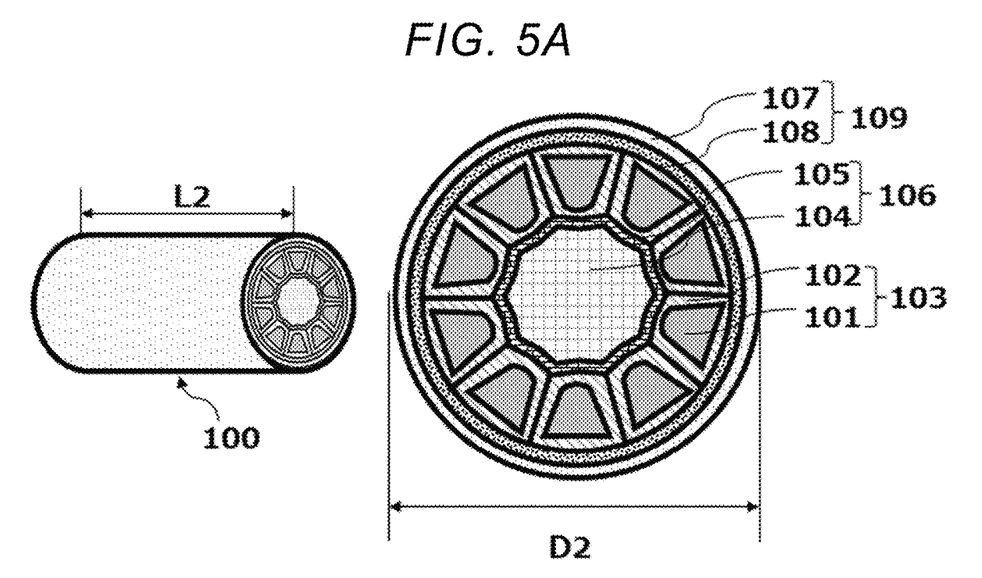
FIG. 5A is a cross-sectional view of the wire including the center member, the circular peripheral wires, and the outer shell after the wire drawing.
Figure 5B:
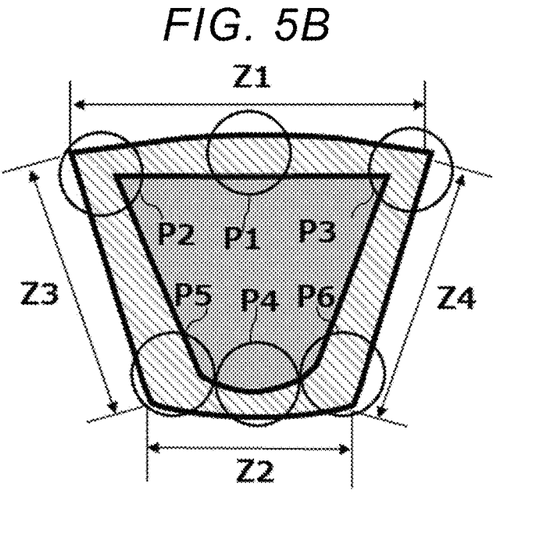
FIG. 5B is a cross-sectional view of the peripheral wires each including the compressible material and the metal tube after the wire drawing.

As shown in FIG. 5, it is confirmed that the cross-sectional shape of the compressive material 101 after the wire drawing is not reduced in a shape similar to the shape before the wire drawing and is locally deformed to a shape different from that before the wire drawing, and the cross section of each of the peripheral wires 103 after the wire drawing is changed from the circular shape to a substantially trapezoidal shape including a first side Z1 in contact with the outer shell 109, a second side Z2 in contact with the center member 106, and a third side Z3 and a fourth side Z4 that are in contact with the adjacent peripheral wires 103.

In addition, as a result of measuring the average porosity by the CAE, it is confirmed that an average porosity of the compressive material 101 at a midpoint P1 of the first side Z1 is smaller than either one of an average porosity of the compressive material 101 at a first point P2 that is an intersection of the first side Z1 and the third side Z3 and an average porosity of the compressive material 101 at a second point P3 that is an intersection of the first side Z1 and the fourth side Z4. This is a characteristic inherent to such a manufacturing process. This is because the pores are locally compacted since the midpoint P1 of the first side Z1 is a location to which a pressure is applied from the outer shell 109 during the wire drawing.

It is confirmed that an average porosity of the compressive material 101 at a midpoint P4 of the second side Z2 is smaller than, by about 20%, either one of an average porosity of the compressive material 101 at a third point P5 that is an intersection of the second side Z2 and the third side Z3 and an average porosity of the compressive material 101 at a fourth point P6 that is an intersection of the second side Z2 and the fourth side Z4. This is also a characteristic inherent to such a manufacturing process. This is because the pores are compacted since the second side Z2 is compressed non-uniformly as compared with the wire (wire 100 using the peripheral wires 103 each having a substantially isosceles trapezoidal shape) due to the reduction of the outer shell 109 during the wire drawing.

Based on the two characteristics described above, it is confirmed that the average porosity distribution of the compressive material 101 at the time of the wire drawing is non-uniform. In addition, the contact state between the peripheral wires becomes point contact in the middle of the wire drawing, and thus the positional deviation is likely to occur along with the deformation, and the compression of the compressive material 101 in the peripheral wires 103 is non-uniform.

In addition, since the cross-sectional shape of each of the peripheral wires 103 before the wire drawing is circular, the cross-sectional shape is locally deformed to a shape different from that before the wire drawing by preferentially introducing strain from the outer shell 109 to a center side of the long side I1 of each of the peripheral wires 103. Therefore, it is found that strain concentration on the metal sheath (covering material) 102 of the peripheral wires 103 occurs, and in particular, equivalent strain of the metal sheath (covering material) 102 at the midpoint P1 of the first side Z1 is larger than that at other portions of the covering material 102.

A procedure for producing the peripheral wires 103 each having a substantially isosceles trapezoidal shape, which are used in the invention, will be described below.

Figure 6A:
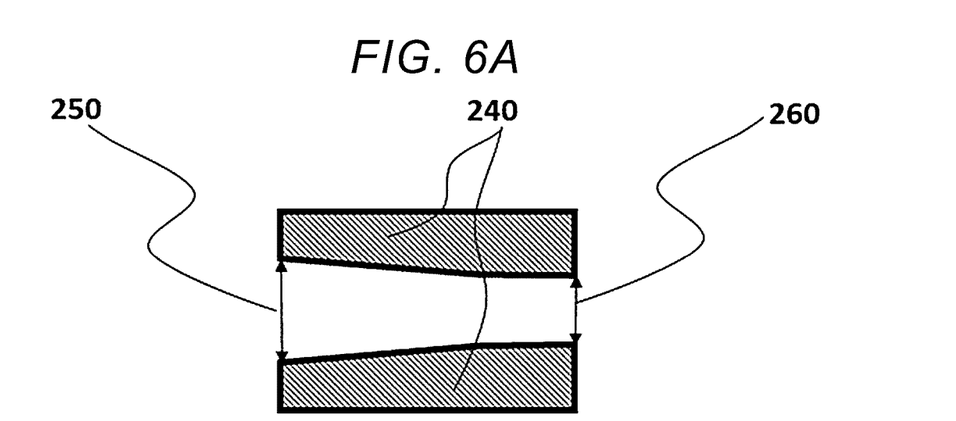
FIGS. 6A, 6B, and 6C are simplified views of a trapezoidal die.
Figure 6B:
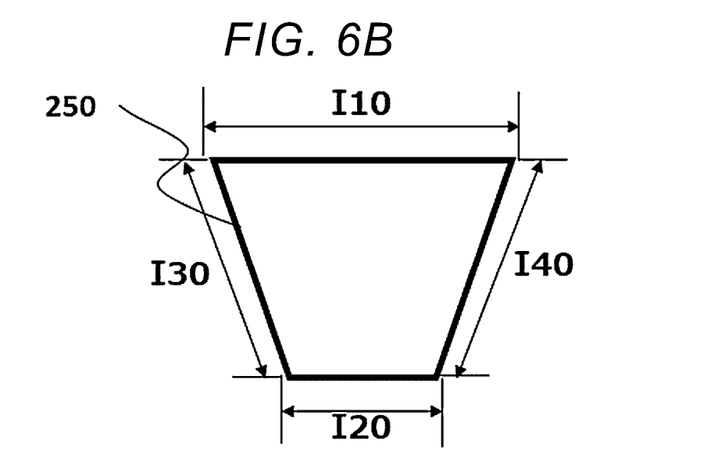
Figure 6C:
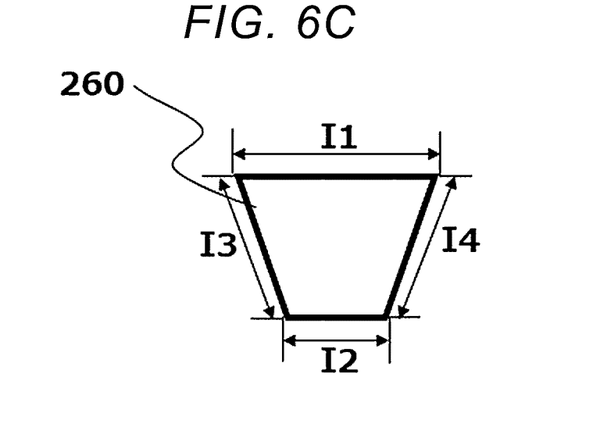

FIGS. 6A, 6B, and 6C show trapezoidal dies for producing the peripheral wires 103 each having the substantially isosceles trapezoidal shape.

A composite including the metal sheath 102 and the compressive material 101 is drawn by the die 210 (see FIG. 3) including the circular hole 230. The inner compressive material 101 is densified by repeating reduction in a cross-sectional area by the wire drawing.

In a final processing stage, the composite passes through a substantially isosceles trapezoidal die 240 shown in FIG. 6A, which includes a substantially isosceles trapezoidal hole 250 on an inlet side and a substantially isosceles trapezoidal hole 260 on an outlet side, so that the peripheral wires 103, whose cross-sectional shape shown in FIG. 1B is the substantially isosceles trapezoidal shape including the long side I1, the short side I2, the first oblique side I3, and the second oblique side I4, are produced.

As shown in FIG. 6B, a cross section of the hole 250 on the inlet side has a substantially isosceles trapezoidal shape including a long side I10, a short side I20, a first oblique side I30, and a second oblique side I40. In addition, as shown in FIG. 6C, a cross section of the hole 260 on the outlet side has a substantially isosceles trapezoidal shape including the long side I1, the short side I2, the first oblique side I3, and the second oblique side I4.

On the other hand, when the peripheral wires 103 pass through the substantially isosceles trapezoidal die 240, a gap is generated between the metal sheath 102 and the compressive material 101 in the peripheral wires 103. When the peripheral wires 103 are used for the wire 100 with the gap left, non-uniform deformation or molding failure of the compressive material 101 may occur in the middle of the wire drawing.

As a countermeasure against the above problem, dimensions of the long side l1, the short side l2, the first oblique side l3, and the second oblique side l4 of the hole 260 on the outlet side of the substantially isosceles trapezoidal die 240 are made smaller than the maximum diameter of the compressive material 101 in the peripheral wires 103 whose cross-sectional shape before the wire drawing is circular, so that the gap generated when the peripheral wires 103 pass through the substantially isosceles trapezoidal die 240 can be eliminated.

In order to allow the circular peripheral wires 103 to pass through an inside of the substantially isosceles trapezoidal die 200, a dimension of the hole 250 on the inlet side of the substantially isosceles trapezoidal die 240 is required to be larger than a maximum diameter of the metal sheath 102 in the peripheral wires 103 each having a circular cross-sectional shape before the wire drawing.

Embodiment 2

Next, a superconducting wire according to Embodiment 2 will be described with reference to FIGS. 4A and 4B.

The superconducting wire according to Embodiment 2 shown in FIGS. 4A and 4B is a wire obtained by drawing the material (see FIGS. 1A and 1B) including the center member 106, the peripheral wires 103 each having the substantially isosceles trapezoidal shape, and the outer shell 109. The wire after the wire drawing is the wire 100 having the length of L2 and the cross-sectional diameter of D2.

As shown in FIGS. 4A and 4B, a cross-sectional shape of the compressive material 101 after the wire drawing is deformed to a shape similar to that before the wire drawing by reducing the shape before the wire drawing in a similar shape, and the cross section of each of the peripheral wires 103 after the wire drawing is changed from the substantially isosceles trapezoidal shape to the substantially annular sector including the first side I11 in contact with the outer shell 109, the second side I21 in contact with the center member 106, and the third side I31 and the fourth side I41 that are in contact with the adjacent peripheral wires 103.

A specific configuration of an aspect of the superconducting wire according to Embodiment 2 will be described with reference to FIG. 4A.

As shown in FIG. 4A, an aspect of the superconducting wire according to Embodiment 2 includes the center member 106 that is a core, the plurality of peripheral wires 103 surrounding the center member 106, and the outer shell 109 disposed outside the peripheral wires 103.

Each of the peripheral wires 103 includes the compressive material (for example, the mixed powder) 101 and the metal sheath (peripheral-wire cover) 102 covering the compressive material 101. Here, the compressive material 101 includes a porous material.

A shape of a cross section perpendicular to the longitudinal direction of the peripheral wire 103 is a substantially annular sector including the first side I11 in contact with the outer shell 109, the second side I21 in contact with the center member 106, and the third side I31 and the fourth side I41 that are in contact with the adjacent peripheral wires 103.

A first pore diameter of the compressive material (porous material) 101 at the midpoint P11 of the first side I11 is larger than either one of a second average pore diameter of the compressive material (porous material) 101 at the first point P12 that is the intersection of the first side I11 and the third side I31 and a third average pore diameter of the compressive material (porous material) 101 at the second point P13 that is the intersection of the first side I11 and the fourth side I41 (Configuration (1)).

In addition, a fourth pore diameter of the compressive material (porous material) 101 at the midpoint P14 of the second side I21 is smaller than either one of a fifth average pore diameter of the compressive material (porous material) 101 at the third point P15 that is the intersection of the second side I21 and the third side I31 and a sixth average pore diameter of the compressive material (porous material) 101 at the fourth point P16 that is the intersection of the second side I21 and the fourth side I41 (Configuration (2)).

According to the superconducting wire of an aspect of Embodiment 2, compression of the compressive material (porous material) 101 is made uniform. In addition, since the strain concentration on the metal sheath (peripheral-wire cover) 102 can be avoided, the disconnection can be avoided.

One characteristic of the wire drawing method according to Embodiment 1 described above is Configuration (1) described above. This is because pores of the compressive material (porous material) 101 are compressed since the first point P12 and the second point P13 are locations to which a pressure is applied from the outer shell 109 during the wire drawing.

Similarly, another characteristic of the wire drawing method according to Embodiment 1 described above is Configuration (2) described above. This is because the pores of the compressive material (porous material) 101 are compressed by compressing the midpoint P14 of the second side I21 during wire drawing of the peripheral wires 103 each having the substantially isosceles trapezoidal shape.

In addition, as shown in FIG. 4A, another aspect of the superconducting wire according to Embodiment 2 includes the center member 106 that is a core, the plurality of peripheral wires 103 surrounding the center member 106, and the outer shell 109 disposed outside the peripheral wires 103.

Each of the peripheral wires 103 includes the compressive material 101 and the metal sheath (peripheral-wire cover) 102 covering the compressive material 101. Here, the compressive material 101 is formed of a porous material.

A shape of a cross section perpendicular to the longitudinal direction of the peripheral wire 103 is a substantially annular sector including the first side I11 in contact with the outer shell 109, the second side I21 in contact with the center member 106, and the third side I31 and the fourth side I41 that are in contact with the adjacent peripheral wires 103.

Here, a pore diameter of the compressive material (porous material) 101 is always larger than a minimum value of pore diameters at (1) the first point P12 that is the intersection of the first side I11 and the third side I31, (2) the second point P13 that is the intersection of the first side I11 and the fourth side I41, and (3) the midpoint P14 of the second side I21. In addition, a pore diameter of the compressive material (porous material) 101 at the midpoint of the first side I11 is larger than a maximum value of the pore diameters at the first point P12 and the second point P13.

According to the superconducting wire of another aspect of Embodiment 2, the critical current property of the wire 100 can be improved by forming the configuration described above.

In particular, regarding the periphery of the first side I11, the pore diameter of the compressive material (porous material) 101 at the midpoint P11 of the first side I11 is larger than the maximum value of the pore diameters at the first point P12 and the second point P13, and thus an effect thereof is higher than that of the comparative wire shown in FIG. 5. This is because the reduction in the pore diameter due to compression is small since the first point P12 and the second point P13 are originally easily deformed and an amount of the mixed powder used as a material of the compressive material (porous material) 101 is also small.

According to the embodiments described above, non-uniform deformation of the material generated inside the wire can be prevented, and the non-uniform porosity distribution and disturbance of the shape of the cross-section perpendicular to the longitudinal direction of the wire can be prevented.

The invention is not limited to the above embodiments and includes various modifications and equivalent configurations within the spirit of the claims. For example, the above embodiments have been described in detail for easy understanding of the invention, and the invention is not necessarily limited to those having all the configurations described. A part of a configuration of one embodiment may be replaced with a configuration of another embodiment. Further, the configuration of another embodiment may be added to the configuration of one embodiment. Further, a part of the configuration of the embodiments may be added to, deleted from, or replaced with another configuration.

What is claimed is:

1. A superconducting wire comprising:
   a core;
   a plurality of peripheral wires surrounding the core; and
   an outer shell disposed outside the peripheral wires, wherein
   each of the peripheral wires includes a porous material and a peripheral-wire cover covering the porous material,
   a shape of a cross section perpendicular to a longitudinal direction of the peripheral wire is a substantially annular sector including a first side in contact with the outer shell, a second side in contact with the core, and a third side and a fourth side that are in contact with the adjacent peripheral wires,
   a first average pore diameter of the porous material at a midpoint of the first side is larger than either one of a second average pore diameter of the porous material at a first point that is an intersection of the first side and the third side and a third average pore diameter of the porous material at a second point that is an intersection of the first side and the fourth side, and
   a fourth average pore diameter of the porous material at a midpoint of the second side is smaller than either one of a fifth average pore diameter of the porous material at a third point that is an intersection of the second side and the third side and a sixth average pore diameter of the porous material at a fourth point that is an intersection of the second side and the fourth side.

2. The superconducting wire according to claim 1, wherein
   the core includes a core member formed by a circular metal rod, and a covering material formed by a first metal tube that is circular and covers the core member,
   the outer shell includes an outer layer and an inner layer,
   the inner layer is formed by a second metal tube that is circular, and
   the outer layer is formed by a third metal tube that is circular.

3. A superconducting wire comprising:
   a core,
   a plurality of peripheral wires disposed to surround the core, and
   an outer shell disposed outside the peripheral wires, wherein
   each of the peripheral wires includes a porous material and a peripheral-wire cover covering the porous material,
   a shape of a cross section perpendicular to a longitudinal direction of the peripheral wire is a substantially annular sector including a first side in contact with the outer shell, a second side in contact with the core, and a third side and a fourth side that are in contact with the adjacent peripheral wires,
   a pore diameter of the porous material is always larger than a minimum value of pore diameters at
      (1) a first point that is an intersection of the first side and the third side,
      (2) a second point that is an intersection of the first side and the fourth side, and
      (3) a midpoint of the second side, and
   a pore diameter of the porous material at a midpoint of the first side is larger than a maximum value of pore diameters at the first point and the second point.

4. The superconducting wire according to claim 3, wherein
   the core includes a core member formed by a circular metal rod, and a covering material formed by a first metal tube that is circular and covers the core member,
   the outer shell includes an outer layer and an inner layer,
   the inner layer is formed by a second circular metal tube, and
   the outer layer is formed by a third circular metal tube.

5. A wire drawing method comprising:
   reducing a cross-sectional diameter of a first wire by wire drawing, the first wire including a center member, a plurality of first peripheral wires surrounding the center member, and an outer shell disposed outside the first peripheral wires, wherein
   each of the first peripheral wires includes a compressive material, and a metal sheath covering the compressive material, and
   a shape of a cross section perpendicular to a longitudinal direction of the first peripheral wire is a substantially isosceles trapezoidal shape including a long side in contact with the outer shell, a short side in contact with the center member, and a first oblique side and a second oblique side that are in contact with the adjacent peripheral wires.

6. The wire drawing method according to claim 5, wherein
   the center member includes
      a core member formed by a circular metal rod, and a covering material formed by a first metal tube that is circular and covers the core member,
   the outer shell includes
      an outer layer and an inner layer,
   the inner layer is formed by a second metal tube that is circular, and
   the outer layer is formed by a third metal tube that is circular.

7. The wire drawing method according to claim 5, wherein
the long side of the first peripheral wire is positioned on an inner circumferential side of the outer shell, and
the short side of the first peripheral wire is positioned on an outer circumferential side of the center member.

8. The wire drawing method according to claim 5, further comprising:
preparing the first wire,
reducing the cross-sectional diameter of the first wire by the wire drawing, and
preferentially introducing strain from the outer shell to both left and right sides of the long side of the first peripheral wire to form a second wire including a second peripheral wire.

9. The wire drawing method according to claim 8, wherein
a cross section of the second peripheral wire is a substantially annular sector including a first side in contact with the outer shell, a second side in contact with the center member, and a third side and a fourth side that are in contact with the adjacent second peripheral wires.

10. The wire drawing method according to claim 9, wherein
a first average porosity of the compressive material at a midpoint of the first side is larger than either one of a second average porosity of the compressive material at a first point that is an intersection of the first side and the third side and a third average porosity of the compressive material at a second point that is an intersection of the first side and the fourth side.

11. The wire drawing method according to claim 9, wherein
a fourth average porosity of the compressive material at a midpoint of the second side is
smaller than either one of a fifth average porosity of the compressive material at a third point that is an intersection of the second side and the third side and a sixth average porosity of the compressive material at a fourth point that is an intersection of the second side and the fourth side.

12. The wire drawing method according to claim 5 further comprising:
preparing
a composite obtained by filling the compressive material in the metal sheath that is cylindrical,
a circular die having a hole diameter smaller than a maximum diameter of the composite, and
a substantially isosceles trapezoidal die including a hole on an inlet side and a hole on an outlet side, in which the hole on the outlet side has the substantially isosceles trapezoidal shape including the long side, the short side, the first oblique side, and the second oblique side;
passing the composite through the circular die to reduce a cross-sectional diameter of the composite to form the first peripheral wire having a circular cross-sectional shape; and
passing the first peripheral wire having the circular cross-sectional shape through the substantially isosceles trapezoidal die to form the first peripheral wire having a substantially isosceles trapezoidal cross-sectional shape.

13. The wire drawing method according to claim 12, wherein
when the first peripheral wire having the circular cross-sectional shape passes through the substantially isosceles trapezoidal die to form the first peripheral wire having the substantially isosceles trapezoidal cross-sectional shape,
the long side, the short side, the first oblique side, and the second oblique side of the hole on the outlet side of the substantially isosceles trapezoidal die are made smaller than a maximum diameter of the compressive material of the first peripheral wire having the circular cross-sectional shape so that no gap is generated between the compressive material and the metal sheath of the first peripheral wire.

* * * * *